Patented Nov. 9, 1943

2,333,672

UNITED STATES PATENT OFFICE 2,333,672

PROCESS OF PRODUCING ALKALINE SULPHATES FROM FERROUS SULPHATE

Thomas C. Oliver, Jackson Heights, N. Y., and Ralph D. Long and Leo H. Crosson, Charlotte, N. C., assignors to Charlotte Chemical Laboratories, Inc., a corporation of North Carolina No Drawing. Application May 31, 1941,
Serial No. 396,154

16 Claims. (Cl. 23—119)

In our application Serial No. 385,530 filed March 27, 1941 there is discussed the pressing economic problem of utilization of the waste product, ferrous sulphate, which is produced in the manufacture of titanium oxide pigment and in the pickling of sheet steel in sulphuric acid baths. The process disclosed in that application, as a very convenient and efficacious procedure for meeting this problem, comprises reacting the ferrous sulphate with an alkaline earth halide to produce an intermediate potentially valuable ferrous halide which upon oxidation is converted into a commercially valuable halide of a higher valent iron, such as for example, ferric chloride.

The invention in the present application involves a related line of research and provides another process for converting the otherwise waste material, ferrous sulphate, into a sulphate product of substantial commercial value. In this case the product is not ferric chloride and in fact is not concerned with commercial utilization of the iron component of the ferrous sulphate. Instead, it relates to the use of the $SO_4$ radical or component of the ferrous sulphate to produce a more valuable sulphate for fertilizers and other commercial products.

This process comprises, effectively transposing the $SO_4$ radical of the ferrous sulphate so as to form first, ammonium sulphate and then utilizing the latter for reaction with an alkali chloride to produce the corresponding alkali sulphate, such as for example, potassium sulphate and sodium sulphate. The latter product is useful in the textile and paper industries, and the ammonium sulphate and potassium sulphate are especially useful in the manufacture of fertilizers.

We are aware of prior processes for recovery of the iron in ferrous sulphate by forming therefrom iron hydroxides and oxides; also prior processes for producing alkali sulphates by reacting certain alkali chlorides with sulphate compounds. In our present process, however, we are only incidentally concerned with the production of the iron compounds since our principal objective is to liberate and transpose the $SO_4$ component of the ferrous sulphate to produce ammonium sulphate and also to form in a subsequent step of the process an alkali sulphate by an improved procedure. These basic distinctions will become more apparent from the detailed description given hereinafter.

The process of our invention may be considered as comprising two general phases or parts, the first being concerned with the transfer of the $SO_4$ radical of the ferrous sulphate to ammonia for producing the intermediate product, ammonium sulphate; and the second, the use of the ammonium sulphate to produce an alkali sulphate, e. g. potassium or sodium sulphate. The ammonium sulphate may be sold as such since it is a valuable product for use in fertilizers. Moreover it is useful in the second part of our process for producing the above mentioned alkali sulphate by reacting the $(NH_4)_2SO_4$ so produced with an alkali chloride. The alkali sulphate formed in this reaction is recovered preferably by the special salting-out procedure of our invention, as described hereafter.

The first part of the process of our invention is concerned with the problem of effectively separating the ammonium sulphate, which is the desired product, from the iron compounds that are formed. When the ferrous sulphate is reacted with the calculated amount of ammonia necessary to form the ammonium sulphate and iron hydroxide most of the iron hydroxide precipitates out of solution, while the ammonium sulphate is still largely in solution. However, the ammonium sulphate cannot be practically separated free of iron at this stage because of the fact that the ferrous sulphate-ammonia reaction is reversible in the presence of ammonium salts with the reformation of soluble iron which contaminates the ammonium sulphate liquor.

For the ammonium sulphate to be commercially valuable it has to be substantially free of iron. Therefore clean separation of the ammonium sulphate from the soluble iron, which is present in the first stage of the above reaction, is a vitally important factor in the commercial success of our process.

In accordance with our invention, we have discovered that by prolonged introduction of ammonia gas into the ferrous sulphate solution, far in excess of that theoretically required for the formation of the iron compound and ammonium sulphate, we render the two reaction products capable of thorough separation. The continuous introduction of excess ammonia into the reaction solution produces a copious precipitate of ammonium sulphate; that is, the previously formed ammonium sulphate is "salted-out" of solution. The excess amount of ammonia gas usually employed for this purpose ranges from about 12% to 17% and we have found it advantageous to use about 16% since at this concentration the ammonium sulphate becomes insoluble in the solution.

The thorough precipitation or salting-out of the ammonium sulphate not only obviates the reformation of soluble iron as above mentioned but also enables complete precipitation of the insoluble iron compounds which may be filtered together with the ammonium sulphate. The precipitation of the ammonium salts, e. g. ammonium sulphate, out of solution causes an increase of hydroxyl ions in the solution and this effects complete precipitation of the ferrous hydroxide or other "iron compound" formed, the latter term being used herein to identify any and all iron hydroxides or oxides formed in this reaction.

The precipitated iron compound above is of a gelatinous nature and by itself is most difficult to filter even with suction. In the process of our invention we overcome this difficulty also by co-precipitation of the ammonium sulphate. The latter precipitates in relatively large size crystals, as contrasted with the minute particle size of the iron compound precipitate, and since the two materials are intimately admixed in the co-precipitate the admixture may be very easily filtered.

The filtrate will consist substantially of ammonia and water, with perhaps traces of salts. This filtrate is recycled for use in the next run since it contains valuable ammonia that must be reclaimed to make the process commercially economical. To provide an economical balance from the standpoint of cost of operation some of the ammonia may be permitted to remain in the recycled liquor and some of it recovered as ammonia gas for use in the salting-out process described above.

Having obtained efficient precipitation and salting-out of solution, of the iron compound and ammonium sulphate, the next problem is to effect separation of the two components in this co-precipitate, whereby the ammonium sulphate will be isolated for commercial use. This cannot be accomplished by dissolving the ammonium sulphate constituent in water since this would again cause formation of soluble iron that would ruin the purity of the ammonium sulphate. Separation might be possible by selective solvent action of different non-aqueous solvents but such procedure would involve substantial expense and require segregation and reclaiming of the solvent. In accordance with our invention we have discovered a simple, inexpensive and yet very efficacious procedure for separating-out the ammonium sulphate as follows:

We have found that by heat treating the co-precipitate under controlled temperature conditions that we can render the iron component substantially water insoluble and at the same time not deleteriously affect the ammonium sulphate. After conversion of the iron to a fixed form, e. g. red iron oxide, the ammonium sulphate component may then be dissolved out with water, leaving the iron as residue.

It thus becomes apparent from the above discussion that the two most important features of this phase of our process are; the efficient quantitative precipitation of the ammonium sulphate by protracted introduction of ammonia sufficient to salt-out the ammonium sulphate, together with the complete co-precipitation of the iron; and the heat treatment for converting the iron component to such form that it may be easily separated from the ammonium sulphate. The iron in the converted form has a red color and is understood to be principally $Fe_2O_3$.

In the above referred to heat treatment we have found that a critical maximum temperature of approximately 140° C. is involved. Substantially any lower temperature down to ordinary room temperatures may be used and, generally speaking, the time required for the heat treatment will depend upon the temperature employed. At room temperatures there is a slow but gradual change of the iron compound to the red iron oxide but in practice it is naturally desirable to accelerate this change by the application of heat. This may be done with increasingly efficient results up to a maximum temperature of about 140° C. In practice we have found it advantageous to work at temperatures between 100° and 140° C. and preferably at about 130° C.

We discovered that if a temperature of about 140° C. is exceeded, the iron compound reacts with the ammonium sulphate and makes it impossible to obtain clean separation of the ammonium sulphate from the iron. In fact when the ammonium sulphate is removed under these conditions it will contain substantial amounts of iron salts which produces a very impure ammonium sulphate. This condition caused by overheating is similar to that described above, before any heat treatment is given; that is, if the co-precipitate of ammonium sulphate and iron compound is attempted to be separated by washing with water and filtering prior to the conversion of the iron compound to the red ferric oxide form. However, when the co-precipitate is heated in accordance with our process to a temperature not greater than 140° C. the ammonium sulphate may be easily leached out with water to produce a substantially pure product.

Referring now more in detail to the ferrous sulphate-ammonia reaction described above, the continuous and extensive introduction of ammonia into the solution of ferrous sulphate forms first a green colored precipitate which makes the solution very viscous and then as more ammonia is added, with stirring or agitation of the mixture, the mixture reverts to a rather thin easily pourable solution and progressively changes color from green to black. The iron compound and ammonium sulphate are both present in the final black colored co-precipitate. In this phase of our process the iron component of the co-precipitate is only a necessary evil which we must eliminate. We are primarily interested in producing in our first phase of the process, ammonium sulphate, and are only concerned with the iron constituent in view of the fact that it is present. Also, we definitely find from our research that the iron compound produced in this manner is of only temporary existence since it gradually changes over by exposure to the atmosphere to red iron oxide form. Furthermore in our process we purposely convert the iron compound to the water-insoluble red ferric oxide so as to enable efficient separation of the ammonium sulphate free from iron for use as such or as a reactant in the second part of our process as described below.

In the second stage of our process in which the ammonium sulphate, produced in substantially pure form as described above, is reacted with an alkali chloride, the products of this reaction, being ammonium chloride and an alkali sulphate, are not as difficultly separable as the above described mixture of iron compound and ammonium sulphate. Separation of ammonium chloride and alkali sulphate has been accomplished heretofore by a complicated crystallization process in which the chloride and sulphate along with several other mixed salts thereof are crystallized at slightly different temperatures. We have developed a substantially simplified but nevertheless very effective procedure for obtaining this separation as follows:

Taking advantage of the different solubilities of the ammonium chloride and the alkali sulphate, such as for example, potassium sulphate, in alkaline solution, we bring about the necessary condition in the solution containing both of these compounds to effect increased solubility of the chloride in the solution and concommitantly decreased solubility of the alkali sulphate, e. g. potassium sulphate. We produce this desirable condition in the process of our invention by passing ammonia into the reaction solution containing the ammonium chloride and potassium sulphate or equivalents, and continuing the addition of the ammonia until a fairly concentrated ammoniacal solution is obtained, such as for example, about 20%–25% ammonia based on the weight of the ammonium sulphate solution. Under these conditions, potassium sulphate which is substantially insoluble in concentrated ammonia solution is salted out of the solution and concurrently the ammonium chloride remains in solution so that they may be easily separated by filtering or centrifuging.

A more detailed understanding of the process of our invention may be had by reference to the following specific examples which are illustrative but not limiting upon the scope of our invention.

EXAMPLE I

| | Grams |
|---|---|
| Ferrous sulphate, e. g. FeSO4 | 192 |
| Water | 250 |
| Ammonia (NH3) | 92 |

The above ferrous sulphate is advantageously in granular form and of sufficient fineness to pass through a 10 mesh screen. In the present example the ferrous sulphate is of the anhydrous form with no water of crystallization and showing an analysis of about 96.58% FeSO4. Various other sulphates may be used having water of crystallization ranging from one half a molecule of water up to the heptahydrate form which has seven molecules of water of crystallization.

The respective amounts of ferrous sulphate and water are adjusted to give a saturated solution of ammonium sulphate and this plan is followed generally throughout our process for economical reasons. The above 250 grams of water may be made up, in different cases, either entirely from fresh water or partly from fresh water and partly from water of crystallization in the ferrous sulphate, or wholly or partly from recycled filtrates of previous runs of the process. In actual commercial practice one would operate with a substantially closed system and recycle the filtrates described hereafter for purpose of reclaiming the relatively large amounts of ammonia that are used in the process for effectively precipitating the ammonium sulphate and potassium sulphate.

The procedure in this specific example, using the respective ingredients and amounts given in the above formula, is as follows: Using 173 grams of water from the filtrate of a previous run, 77 grams of fresh water were added and the ferrous sulphate was fed into the water and recycled liquor mixture over a period of about fifteen minutes. During this time anhydrous ammonia was introduced into the mixture and this mixture constantly stirred.

The reaction that takes place in this first step of the process may be represented as follows:

$$FeSO_4 + 2NH_3 + 2H_2O \rightarrow (NH_4)_2SO_4 + Fe(OH)_2$$

To carry out the above reaction there is required approximately 43 grams of ammonia. This amount of ammonia is sufficient for reacting with all of the ferrous sulphate to produce the ammonium sulphate and ferrous hydroxide. At this stage the ferrous hydroxide is gelatinous and not filtrable as described above, while the ammonium sulphate is substantially in solution. Now in accordance with the process of our invention, we continue to introduce the gaseous ammonia into the mixture so as to throw out or salt out the ammonium sulphate. To effect this salting out step there is required in the present instance an additional 50 grams of ammonia. The theoretical amount of ammonium sulphate produced in the above reaction with the specific quantities of ingredients used in this example, is 161 grams; and a total of 93 grams of ammonia is sufficient to produce and to salt out the ammonium sulphate. This is shown by the following Seidell table which gives the solubility of ammonium sulphate in aqueous ammonia solution at 25° C.

Grams per 1000 grams saturated solution

| NH3 | (NH4)2SO4 |
|---|---|
| 0.0 | 433.4 |
| 33.2 | 281.5 |
| 91.1 | 153.3 |
| 121.4 | 103.0 |
| 161.2 | 0.0 |

By salting out the ammonium sulphate to produce a saturated solution thereof we render the iron precipitate capable of being filtered. As previously mentioned the ferrous hydroxide precipitate which is first formed in the above reaction is of gelatinous character and is impractical to filter even with suction and this condition will continue to exist in the presence of just sufficient amount of ammonia to react with the ferrous sulphate. However, as a result of using the 50 grams excess of ammonia, we co-precipitate out of solution the ammonium sulphate along with the iron hydroxide; and this co-precipitate is easily filtered for the reason already discussed. The filtrate is substantially clear indicating that very little if any iron remains in the filtrate, and it is recycled for use in the first stage reaction described above.

The co-precipitate of ammonium sulphate and iron compound has entrapped in it approximately 34% by weight of ammonium hydroxide and water. In commercial practice this proportion of ammonia could be substantially reduced by centrifuging the reaction mixture, although the precipitate will still contain appreciable amounts of ammonia which is removed in our process by the heat treatment now to be described.

The co-precipitate is removed from the filter and is heated to a temperature of about 130° C. At such temperature the ammonia and water content of the precipitate is liberated and recycled for subsequent use in the process. Besides liberation and reclaiming of the ammonia in this step of the process, which is important from the economical standpoint, this controlled heat treatment converts the iron compound to the stable ferric oxide, $Fe_2O_3$. In other words, this step fixes the iron compound so that no reaction takes place between the iron and ammonium sulphate when the ammonium sulphate is leached with water.

A temperature of approximately 140° C. for the above heat treatment is a critical maximum temperature since apparently above this temperature the ammonium sulphate breaks down to form the acid or bisulphate by liberation of ammonia; and this acid sulphate quickly reacts with the iron compound to reform soluble ferrous sulphate which would go into solution when the ammonium sulphate is leached from the overheated co-precipitate.

However, when operating in accordance with our process, which utilizes temperatures below 140° C., the co-precipitate may be leached with water to dissolve the ammonium sulphate, leaving the iron oxide behind as a residue. The filtrate produced in this manner has an extremely low iron content as may be indicated by the sensitive test with potassium thiocyanate. In the specific example under consideration the calculated quantities of ammonium sulphate and ferric oxide are approximately 161 grams of the former and 97 grams of the latter, giving a total of 258 grams. In this example we actually obtained 245 grams which constitutes 95% recovery.

In effecting separation of the ammonium sulphate from the dried co-precipitate in accordance with a preferred procedure, the precipitate is washed with just sufficient water to produce a saturated solution of the ammonium sulphate in the filtrate. The process is expedited by using hot water although water at room temperature may be used. In the example under consideration we used water at approximately 200° F., for leaching out the ammonium sulphate and obtained a saturated solution which contained 123 grams of ammonium sulphate. Subsequent washings of the precipitate produced an additional 30 grams of ammonium sulphate. The yield obtained in this case was approximately 95% of theoretical and the yield of iron compound recovered was approximately 98% of theoretical. This iron compound may be used as pigment or as iron ore but is of only incidental concern in our process which is directed primarily to the sulphate radical and the use of this radical to produce commercially valuable sulphate compounds.

The ammonium sulphate which is isolated as above described in the form of a saturated solution may be concentrated further and down to dryness if desired. The product so produced is useful as such and in fact is a very valuable component of commercial fertilizers.

Now, when it is desired to utilize the ammonium sulphate for the manufacture of alkali sulphate, the following procedure may be carried out. In this example we refer especially to the use of potassium chloride for producing potassium sulphate, but it is to be understood that sodium chloride may be similarly used where it is desired to produce sodium sulphate as the end product.

In this second stage of our process the saturated solution of ammonium sulphate is treated with calculated amounts of potassium chloride in the commercial form known as muriate of potash. The following reaction takes place:

$$(NH_4)_2SO_4 + 2KCl \rightarrow K_2SO_4 + 2NH_4Cl$$

The muriate of potash is added to the solution of ammonium sulphate which is obtained as outlined above. This addition is done gradually and sufficient time is allowed to elapse for the reaction to go to completion. In view of the fact that we are working with saturated solutions, for economical reasons, the time required for the reaction to take place is longer than would be required if sufficient water were used to dissolve completely the ammonium sulphate and muriate of potash. However, by using smaller amounts of water here we have smaller volume to evaporate or to ammoniate to produce the final potassium sulphate. As above described, the potassium sulphate formed in this reaction may be separated from the ammonium chloride by carefully controlled crystallization processes. However, in accordance with our process we effect separated from the ammonium chloride by caretroducing into the reaction mixture of potassium sulphate and ammonium chloride, a sufficient amount of ammonia gas to salt out the potassium sulphate.

By increasing the strength of the ammonia in this solution we progressively decrease the solubility of the potassium sulphate in the solution and concurrently increase the solubility of the ammonium chloride in the ammoniacal solution. In the specific example being described 60 grams of ammonia were used to salt out the potassium sulphate. This constitutes approximately 22% of ammonia based on the weight of the ammonium sulphate solution used.

Upon introduction of the ammonia into the solution of potassium sulphate and ammonium chloride the temperature of the solution will normally rise from room temperature to about 110° F. depending upon the rate at which the ammonia is added. To prevent liberation of too much ammonia from the solution the latter may be cooled.

The introduction of ammonia causes the potassium sulphate to precipitate very quickly and to come down in a rather heavy crystalline form. This precipitate is easily separated from the ammonium chloride by filtering or centrifuging and may then be suitably dried and freed of ammonia to produce a commercial form of potassium sulphate. The potassium sulphate product which we obtained in this example gave the following approximate analysis:

|  | Per cent |
|---|---|
| $K_2SO_4$ | 90.02 |
| KCl | 0.20 |
| $NH_4Cl$ | 3.00 |
| $(NH_4)_2SO_4$ | 6.78 |

The above analysis meets the requirements of commercial fertilizers. The amount of $K_2SO_4$ may be increased by centrifuging instead of filtering since the 3% of ammonium chloride which is entrapped in the mixture would be thereby greatly reduced. However, the product as above represented passes the "Fertilizer Handbook" specifications. As suggested, this product may be considered as an impure form of potassium sulphate, and it has also been considered in the trade as a complex salt comprising a predominant amount of potassium sulphate and a minor amount of ammonium sulphate as indicated in the above analysis. Accordingly, it is to be understood that the term "potassium sulphate" as used in the claims herein is not to be limited to pure potassium sulphate but also covers this impure or complex form of product.

To reclaim the ammonium chloride which is in solution in the last reaction described above, the filtrate may be treated with calcium oxide and the mixture heated to form calcium chloride and ammonia as represented by the following reaction:

$$2NH_4Cl + CaO + \text{heat} \rightarrow CaCl_2.H_2O + 2NH_3$$

The liberated ammonia will be reclaimed and recycled for further use in the foregoing process.

The calcium chloride produced in this reaction may be used economically to advantage in the process of our related invention as disclosed in our above copending application Serial No. 385,530 filed March 27, 1941.

EXAMPLE II

In a second illustrative example for carrying out our process we have used the heptahydrate form of ferrous sulphate, namely, $FeSO_4.7H_2O$. When using this material allowance is made for the water of crystallization as indicated in the following formula:

| | Grams |
|---|---|
| $FeSO_4.7H_2O$ | 450 |
| $H_2O$ | 329 |
| $NH_3$ | 120 |

The above 329 grams of water are made up as follows: 204 grams of water of crystallization in the ferrous sulphate;

117 grams of water from the filtrate of a previous run; and 8 grams of fresh water added.

These quantities give a saturated solution of ammonium sulphate as in the first example described above. The products in the two cases are the same since more water is liberated as shown by the following reaction:

$$FeSO_4.7H_2O + 2NH_3 \rightarrow (NH_4)_2SO_4 + Fe(OH)_2 + 5H_2O$$

To react with the ferrous sulphate shown above approximately 55 grams of ammonia are required and to salt out the ammonium sulphate as previously described there is required an additional amount of approximately 65 grams of ammonia.

The procedure from this point on in this example is identical or substantially the same as that described above in connection with the first example. The principal difference involved when using one of the hydrate forms of ferrous sulphate as the starting material is that the water of crystallization has to be taken into account so as to produce the saturated solution of ammonium sulphate. Since water of crystallization is liberated in the reaction less water is added at the beginning. It follows that mixtures of the anhydrous ferrous sulphate with the hydrate forms such as the monohydrate or heptahydrate may be used and the proper allowance made for the varying amounts of water of crystallization.

In the reaction between ammonia and ferrous sulphate in the first stage of our process as described hereinabove the iron compound produced may be in the form of iron hydroxide, e. g., ferrous hydroxide, or in the form of iron oxide, e. g., ferrous oxide; or a mixture of hydroxides and oxides. Also the above described heat converted co-precipitate may contain one or more oxides or hydroxides. For sake of clarity we have referred to such products or mixture of products, in the accompanying claims as "iron compound" and it is to be understood that this is an inclusive term for identifying any and all of the iron products in question.

Various modifications and changes may be made in the materials and process conditions described hereinabove without departing from the scope of our invention and we intend that the appended claims cover all equivalents to those products and conditions expressed therein. For example, we have described above in connection with the second phase of our process, the use of alkali chlorides, e. g. sodium and potassium chlorides and it is to be understood that other suitable chlorides which will react with the ammonium sulphate to produce commercially useful sulphate products may be employed. For instance magnesium chloride may be reacted with the ammonium sulphate to produce magnesium sulphate or Epsom salts; the other product of the reaction being the same as in the previous cases, namely, ammonium chloride.

The production of iron oxide, as generally referred to hereinabove is more fully disclosed and claimed in copending application Serial Number 463,074 filed October 23, 1942.

We claim:

1. A process for utilizing waste ferrous sulphate by transposing the $SO_4$ radical of this compound and forming therewith a sulphate compound of substantial commercial value comprising, reacting a solution of ferrous sulphate with gaseous ammonia sufficient in amount to form ammonium sulphate and iron compound, continuing the addition of the gaseous ammonia to the reaction mixture until a readily filtrable precipitate of ammonium sulphate and iron compound is formed, removing said precipitate from the reaction solution, heating said precipitate to a temperature ranging between approximately room temperature and a maximum temperature of approximately 140° C. to convert the iron compound to a stable form, and dissolving out the ammonium sulphate from the precipitate with water.

2. A process for utilizing ferrous sulphate to form a commercially valuable sulphate product comprising treating the ferrous sulphate with excess, gaseous ammonia until a readily filtrable precipitate of ammonium sulphate and iron compound is formed, removing said precipitate from the reaction solution, and drying the reaction products at a temperature less than 140° C. to convert the iron compound to a stable form and thereby to enable separation of the ammonium sulphate in water solution.

3. A process for preparing a commercially valuable sulphate product starting with waste ferrous sulphate comprising treating the ferrous sulphate in ammoniacal solution and with sufficient excess of gaseous ammonia until a readily filtrable precipitate of ammonium sulphate and iron compound is formed, separating the precipitate from the reaction solution, heating the precipitate to effect substantial removal of ammonia and to convert the iron compound into stable form, and thereafter separating out the ammonium sulphate in water solution.

4. A process for producing a commercially valuable sulphate product from waste ferrous sulphate, comprising treating the ferrous sulphate with a substantial excess of gaseous ammonia until a readily filtrable precipitate of ammonia sulphate and iron compound is formed, removing said precipitate from the reaction solution, heat treating the precipitate at a temperature not greater than approximately 140° C. to convert the iron compound to a stable form, removing the ammonium sulphate therefrom in water solution and treating said ammonium sulphate with an alkali chloride to produce an alkali sulphate and ammonium chloride solution, and recovering ammonia from the solution so obtained and returning it to the first step in the process.

5. In a process of utilizing ferrous sulphate to produce a more valuable sulphate product and in which the ferrous sulphate is reacted with ammonia to form ammonium sulphate and iron compound, the improvement of treating the ferrous sulphate with such a large excess of gaseous ammonia that the ammonium sulphate and iron compound are precipitated out of solution and may be readily separated therefrom by filtering or centrifuging, and separating said precipitate from the reaction solution.

6. A process for utilizing ferrous sulphate to produce a more valuable sulphate product therefrom, comprising preparing a solution of ferrous sulphate, introducing gaseous ammonia into said solution sufficient to react therewith to produce an iron compound and ammonium sulphate, continuing the introduction of gaseous ammonia until the amount added is at least about 12% to 17% in excess of that required to form the iron compound and ammonium sulphate, and until a readily filtrable precipitate of ammonium sulphate and iron compound is formed, removing said precipitate from the reaction solution, converting the iron to a stable, non-water-soluble form, and separating the ammonium sulphate from the stable iron compound.

7. A process for utilizing ferrous sulphate to produce a more valuable sulphate product therefrom, comprising preparing a supersaturated solution of ferrous sulphate, introducing gaseous ammonia into said solution sufficient to react therewith to produce an iron compound and ammonium sulphate, continuing the introduction of gaseous ammonia in relatively large excess until a readily filtrable precipitate of ammonium sulphate and iron compound is formed, removing said precipitate from the reaction solution, and separating the ammonium sulphate from the precipitated iron compound.

8. A process for utilizing ferrous sulphate to produce a more valuable sulphate product therefrom, comprising preparing a solution of ferrous sulphate, introducing gaseous ammonia into said solution sufficient to react therewith to produce an iron compound and ammonium sulphate, continuing the introduction of gaseous ammonia in relatively large excess until a readily filtrable precipitate of ammonium sulphate and iron compound is formed, removing said precipitate from the reaction solution, and heating the precipitated mixture of iron compound and ammonium sulphate at a temperature sufficiently high to convert the iron to a fixed stable form but below that at which the ammonium sulphate begins to break down and cause reversion of the iron to a soluble form.

9. A process for utilizing ferrous sulphate to produce a more valuable sulphate product therefrom, comprising preparing a solution of ferrous sulphate, introducing gaseous ammonia into said solution sufficient to react therewith to produce an iron compound and ammonium sulphate precipitate, continuing the introduction of gaseous ammonia in relatively large excess until a readily filtrable precipitate of ammonium sulphate and iron compound is formed, removing said precipitate from the reaction solution, and heating the precipitated mixture of iron compound and ammonium sulphate at a temperature not substantially higher than about 140° C.

10. In the process of utilizing ferrous sulphate to produce a more valuable sulphate product and in which the ferrous sulphate is treated with sufficient excess gaseous ammonia to form a readily filtrable precipitate of iron compound and ammonium sulphate, the step of heat treating said precipitate, after removal thereof from the reaction solution at a temperature not greater than about 140° C. to convert the iron compound to a stable form so that the ammonium sulphate component may be dissolved out of the precipitate without dissolving any substantial amount of the iron compound.

11. In the process of utilizing ferrous sulphate to produce a more valuable sulphate product and in which the ferrous sulphate is treated with excess gaseous ammonia until a readily filtrable precipitate of ammonium sulphate and iron compound is formed, the step of heat treating said precipitate, after removal thereof from the reaction solution at a temperature of about 100° C. to 140° C. to convert the iron compound to a stable form so that the ammonium sulphate component may be dissolved out of the precipitate without dissolving any substantial amount of the iron compound.

12. In the process of utilizing ferrous sulphate to produce a more valuable sulphate product and in which the ferrous sulphate is treated with excess gaseous ammonia that forms a filtrable precipitate of iron compound and ammonium sulphate, the step of heat treating said precipitate, after removal thereof from the reaction solution at a temperature of about 130° C. to convert the iron compound to a stable red ferric oxide so that the ammonium sulphate component may be dissolved out of the precipitate without dissolving any substantial amount of the iron compound.

13. A process for producing from ferrous sulphate a more valuable commercial sulphate product, comprising treating a ferrous sulphate solution with a relatively large excess of gaseous ammonia until a readily filtrable precipitate of ammonium sulphate and iron compound is formed, removing said precipitate from the reaction solution, heat treating the reaction precipitate to convert the iron to a stable form without deleteriously affecting the ammonium sulphate, forming a solution of the ammonium sulphate, treating said latter solution with an alkali chloride to form the desired alkali sulphate and ammonium chloride, further treating said solution with gaseous ammonia to salt out of solution the alkali sulphate, separating said alkali sulphate, recovering ammonia from the solution so obtained and returning at least a substantial portion of the recovered ammonia to the first step in the process.

14. A process of producing sodium sulphate comprising treating ferrous sulphate with excess gaseous ammonia until a readily filtrable precipitate of ammonium sulphate and iron compound is formed, removing said precipitate from the reaction solution, heating said iron compound and ammonium sulphate to a temperature not greater than about 140° C., dissolving out the ammonium sulphate, treating the latter with sodium chloride to form sodium sulphate, introducing excess gaseous ammonia to salt out of solution said sodium sulphate, recovering ammonia from the solution so obtained and returning at least a substantial portion of the recovered ammonia to the first step in the process.

15. A process for producing an alkali sulphate, comprising treating ferrous sulphate with a substantial excess of gaseous ammonia until a readily filtrable precipitate of ammonium sulphate and iron compound is formed, removing said precipitate from the reaction solution, converting the iron compound to a stable form, separating the ammonium sulphate from said iron compound, treating said ammonium sulphate with an alkali chloride to form the corresponding alkali sulphate, introducing into the alkali sulphate reaction solution a large excess of gaseous ammonia until said alkali sulphate is precipitated out of solution and may be easily separated therefrom by filtering or centrifuging, and recovering the ammonia from the solution so obtained and returning at least a substantial portion of the recovered ammonia to the first step in the process.

16. A process for producing an alkali sulphate, comprising treating ferrous sulphate with gaseous ammonia in an amount by weight of approximately 12% to 17% in excess of the theoretical amount required for the formation of the reaction products, until a readily filtrable precipitate of ammonium sulphate and iron compound is formed, removing said precipitate from the reaction solution, converting the iron compound to a stable form, separating the ammonium sulphate from said iron compound, treating said ammonium sulphate with an alkali chloride to form the corresponding alkali sulphate and ammonium chloride, removing said alkali sulphate from the reaction solution, recovering ammonia from the remaining solution of ammonium chloride and returning at least a substantial portion of said recovered ammonia to the first step in the process.

THOMAS C. OLIVER.
RALPH D. LONG.
LEO H. CROSSON.

CERTIFICATE OF CORRECTION.

Patent No. 2,333,672. November 9, 1943.

THOMAS C. OLIVER, ET AL.

It is hereby certified that error appears in the printed specification of the above numbered patent requiring correction as follows: Page 4, second column, line 17-18, for "separated from the ammonium chloride by caretroducing" read --separation much more simply and easily by introducing--; and that the said Letters Patent should be read with this correction therein that the same may conform to the record of the case in the Patent Office.

Signed and sealed this 4th day of January, A. D. 1944.

(Seal)

Henry Van Arsdale,
Acting Commissioner of Patents.